US008543732B2

(12) United States Patent
Ryan (10) Patent No.: US 8,543,732 B2
(45) Date of Patent: Sep. 24, 2013

(54) METHOD AND APPARATUS FOR MULTIPLEXING INTERNET DOMAIN NAMES

(76) Inventor: William Kenneth Ryan, Lynchburg, VA (US)

(*) Notice: Subject to any disclaimer, the term of this patent is extended or adjusted under 35 U.S.C. 154(b) by 1432 days.

(21) Appl. No.: 11/223,613

(22) Filed: Sep. 9, 2005

(65) Prior Publication Data
US 2006/0036767 A1 Feb. 16, 2006

Related U.S. Application Data

(63) Continuation of application No. 10/780,359, filed on Feb. 17, 2004, which is a continuation-in-part of application No. PCT/US02/14131, filed on May 3, 2002, which is a continuation-in-part of application No. 09/337,315, filed on Jun. 22, 1999, now Pat. No. 6,412,014.

(51) Int. Cl.
*G06F 15/16* (2006.01)
*G06F 15/173* (2006.01)
*H04L 29/12* (2006.01)
*H04L 29/08* (2006.01)
*H04L 29/06* (2006.01)

(52) U.S. Cl.
CPC .... *H04L 29/12066* (2013.01); *H04L 29/08072* (2013.01); *H04L 29/06* (2013.01)
USPC ........... 709/245; 709/203; 709/217; 709/219; 709/238

(58) Field of Classification Search
USPC ........................ 709/238, 219, 203, 245, 217
See application file for complete search history.

(56) References Cited

U.S. PATENT DOCUMENTS

| | | | | |
|---|---|---|---|---|
| 6,125,395 A * | 9/2000 | Rosenberg et al. | ........... | 709/228 |
| 6,256,671 B1 * | 7/2001 | Strentzsch et al. | ............ | 709/227 |
| 6,314,469 B1 * | 11/2001 | Tan et al. | ...................... | 709/245 |
| 6,560,634 B1 * | 5/2003 | Broadhurst | ................... | 709/203 |
| 6,901,436 B1 * | 5/2005 | Schneider | ..................... | 709/219 |
| 7,020,602 B1 * | 3/2006 | Kim et al. | ......................... | 704/8 |
| 7,136,932 B1 * | 11/2006 | Schneider | .................... | 709/245 |
| 2001/0025320 A1 * | 9/2001 | Seng et al. | ..................... | 709/245 |
| 2002/0033846 A1 * | 3/2002 | Balasubramanian et al. | | 345/764 |
| 2002/0138649 A1 * | 9/2002 | Cartmell et al. | ............. | 709/245 |
| 2003/0005157 A1 * | 1/2003 | Chung et al. | .................. | 709/245 |
| 2003/0115040 A1 * | 6/2003 | Xing | ................................ | 704/8 |
| 2003/0167311 A1 * | 9/2003 | Kirsch | ........................... | 709/206 |

(Continued)

OTHER PUBLICATIONS

Internationalizing domain names in Application (IDNA)—Mar. 2003—P.Faltstrom, P. Hofman, A. Costello☐☐IETF Network working Group.*
McDonald, Intellectual Property and Privacy Issues on the Internet, J.P.O.S., Jan. 1997 p. 47.

(Continued)

*Primary Examiner* — Catherine Thiaw
(74) *Attorney, Agent, or Firm* — Donavon Lee Favre (57) ABSTRACT

The current disclosure describes an edge application (user agent) that supports name multiplexing and allows users the convenience of the 'name*number.com' format while allowing registration of the real domain name as exemplified by 'ml-name-number.com' which parallels the approach standardized for Internationalized Domain Names. Multiplexed domain names allow a virtually unlimited number of domain names under any Internet top level domain. The current improvement requires no new central associated directories, multi-tiered or sub-directories. It does not require modification of the DNS to allow additional characters such as the asterisk. It uses the DNS exactly as it is configured today.

16 Claims, 4 Drawing Sheets

(56) References Cited

U.S. PATENT DOCUMENTS

2004/0015584 A1* 1/2004 Cartmell et al. .............. 709/225
2004/0044791 A1* 3/2004 Pouzzner ...................... 709/245
2004/0139086 A1* 7/2004 Hasenau ....................... 707/100
2008/0016233 A1* 1/2008 Schneider .................... 709/230

OTHER PUBLICATIONS

Dupre, A Solution to the Problem? Trademark Infringement and Dilution by Domain Names Bringing the Cyberworld in Line with the "Real" World, TMR pp. 629-637, vol. 87.

Singh, Gateway Pages: a Solution to the Domain Name Conflict? TMR, p. 1234, vol. 91.

Sartori, A Proposal for the Registration of Domain Names, TMR p. 638, pp. 653-656, vol. 87.

Faltstrom Signposts in Cyberspace the Internet Domain Name System and Internet Navigation. published by National Research Council of the National Academies, Copyright 2005. http://www.nap.edu/catalog.php?record_id=11258#10c downloaded on Oct. 31, 2011 pp. 153-175, 187, 271, 349-370.

* cited by examiner

METHOD AND APPARATUS FOR MULTIPLEXING INTERNET DOMAIN NAMES

CROSS-REFERENCE TO RELATED APPLICATIONS

For the purposes of a U.S. patent application filing, the present application is a continuation in part of U.S. patent application Ser. No. 10/780,359, filed Feb. 17, 2004 which in turn is a continuation in part of International Application Number PCT/US02/14131 Ryan, filing date (3 May 2002), which in turn is a continuation in part of Ser. No. 09/337,315, filed Jun. 22, 1999, now U.S. Pat. No. 6,412,014 B1 Ryan (Jun. 25, 2002) the priority of which for U.S. purposes was claimed in International Application Number PCT/US02/14131 Ryan. The publication number of the PCT application is WO 03/094009 A1 (published 13 Nov. 2003). The disclosure of all of the above recited applications is hereby incorporated by reference into the present application. U.S. patent application Ser. No. 10/780,359 was published as US-2004-0162916-A1 on 19 Aug. 2004.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

The present invention is directed to a method and apparatus for obtaining access to a numerical IP address.

The Internet can link your computer to any other computer connected to the Internet. The reason the Internet works is that every computer connected to it uses the same set of rules and procedures (known as protocols) to control timing and data format. The set of commands and timing specifications used by the Internet is called Transmission Control Protocol/Internet Protocol, universally abbreviated as TCP/IP.

The TCP/IP protocols include the specifications that identify individual computers and exchange data between computers.

Most computers are connected to local networks that connect through gateways to the Internet backbone. The core of the Internet is the set of backbone connections that tie the local networks together and the routing scheme that controls the way each piece of data finds its destination.

The Internet and its applications (e.g. www, e-mail, file transfer protocol) use an addressing system called the Domain Name System. This system translates a character string such as "jones.com" into an IP address which is the actual address to a network resource. This is either a 32-bit numeric string or 128-bit hexadecimal string, depending on IP version. While it is possible to address a resource directly with a combination of protocol type and address, the Domain Name System was devised to provide an intuitive addressing scheme. The ".com" level is called the Top Level Domain or TLD. The name before the TLD, in this case "jones", in the example would represent a Second Level Domain or SLD. The term "domain name" is generally understood to be the combination of a TLD and a SLD. This is considered, for the purposes of the present patent application, as the conventional Domain Name System. Second level domains such as .co.uk and .com.au function as top level domains within their respective country code Top Level Domains and should be considered as such.

Internet activity can be defined as computers communicating with other computers using TCP/IP. The computer that originates a transaction must identify its intended destination with a unique address. Every computer on the Internet has an Internet Protocol address, or IP address, which contains routing information that identifies its location.

It is much easier to remember and use the domain name than to type in the IP address. The Domain Name System and its ability to address a resource "by name" become even more important as Internet Protocol version 6 (IPv6) comes into use, since the addresses in IPv6 are longer. Computers have no trouble working with big strings of numbers like this, but humans are not so skilled. Therefore, most computers on the Internet (except the ones used exclusively for internal routing and switching) also have a host name, which is part of the Domain Name System (DNS). A host name is an address that uses words instead of numbers.

The Domain Name System is composed of a number of Top Level Domains. Fully qualified DNS names generally have an individual host name, followed by a top level domain name for a computer connected to the Internet that generally identifies the type of institution that uses the address, such as .com for commercial businesses or .edu for schools, colleges and universities. The University of Washington's DNS domain name is washington.edu, Microsoft's is microsoft.com.

Within the United States, the last letters of the domain name usually tell what type of institution owns the computer. Some large institutions and big corporations divide their domain addresses into sub-domains. You might even see some sub-domains broken into sub-sub-domains.

Top Level Domains can also identify the country in which the system is located, such as .ca for Canada or .fr for France. Sometimes, a geographic domain name will also include a sub-domain that identifies the district within the larger domain.

This is the basic model for translating a domain name to an IP address: a client application such as a web browser on a user's computer sends a domain name request through the network to the closest domain name server or resolver, a computer which acts as a shared storage resource to match a domain name with its IP address. If the closest domain name server does not have this information, it forwards the request upstream to a more central name server until the correct match is made, or a "not found" error message is returned. The name server returns the IP address which is then used through the network to contact the computer having that particular IP address.

The domain name system for TLD's has been handed over by the US Government to ICANN—the Internet Corporation for Assigned Names and Numbers—which has begun approving the addition of new Top Level Domains (TLD's). National committees normally handle national Top Level Domains and national domain structures may differ from one another. For example, a commercial domain in Korea is registered as "xxx.co.kr'" while an Australian registration would use the format "xxx.com.au" but Sweden has no special designation. Companies are registered as "xxx.se". In each case, the 'xxx' must be unique within each domain and can represent a variable number of letters and/or numbers, and may include a hyphen.

The Domain Name System was created when the Internet was still young and (relatively) small, and when only a few major corporations and major universities were expected to have Internet connections. This 'few-user' bias is shown in other ways by the use of .gov to indicate only the United States government and .mil to designate only the United States military establishment. There was no TLD defined for individuals, although one has been opened recently as ".name".

Within each TLD or national domain there may be no more than one second level domain combined with the TLD such as 'jones.com' or 'jones.net' and allocation of these names normally has been on a first come, first served basis. People and companies have been allowed to register any name and any number of names, including generic descriptions, as long as these names have not already been registered by someone else. Many violations of trademark and other property rights have been claimed. Registered names have been given Intellectual Property Right status, giving the owner exclusive, international rights to use that name as an identity in the Internet. The .com and national domains, and several of the new TLD's such as .biz and .name are the ones potentially most impacted by the need for 'exclusivity'. Despite the addition of new TLD's, the .com top level has maintained its status as the de facto standard for business and commercial use. Many companies consider it a commercial imperative to have their names registered under the .com TLD. Although two or more people or companies may have equally legitimate rights to a name, only one per TLD is allowed to use it on the Internet. An example is Apple, which may be the music publishing company founded by the Beatles, or the computer company founded by Steve Jobs, or maybe some organic produce company. Only one can identify itself as "apple.com". There are at least 5 companies named Amazon in New York City. There are approximately 100 companies in California named "Great Wall". Only one company on the Internet can identify itself as "plumber.com", giving that company exclusive international rights to identify itself with the generic term.

There are also examples of misrepresentation and "namenapping" or "cybersquatting". The supply of available, appropriate names, especially within the .com TLD, has rapidly diminished, leading to defensive registrations and an expensive secondary (speculative) market in domain names.

The situation is patently unfair and contrary to previous International Property Rights concepts. Unlike the telephone system, which is inclusive and based on all-to-all communication, the Internet is exclusive with a 'landed gentry' owning the right to create and distribute information under their recognized names. The populace, both as individuals and as society in general, would be better served by the communications technology of the Internet if these problems were resolved.

The above general information concerning the Internet was taken in part from COMPUTING FUNDAMENTALS, Second Edition, pages 295 to 297 by Peter Norton, published by Glencoe McGraw-Hill (1987).

As outlined above, a problem with the Internet is that each domain name (individual name plus top level domain) is unique, and duplicates are not allowed. Various companies have the same name, sometimes on the same type or goods or services, but only the first company that registers on a top level domain is allowed to use that name, giving that particular company a monopoly on a name. The same is true with Trademarked goods. The same Trademark is used by different companies, sometimes on the same types of goods, but at different locations, but only the first company to register the name on a domain is allowed to use the Trademark as a domain name. This makes finding a company by its name or the name of the product that it produces or the service that it provides difficult using domain names.

INTERNET ONE of the British Indian Ocean Territory has a practice, which is even more monopolistic against residents of the territory than the other national Internet organizations. Residents are forced to register as "name".com.io, a third level domain. Other registrants are allowed to register domain names on a first come, first registered basis, with a sub-directory of non .io domain names replacing the first registration for duplicate names. The sub-directory for non .io names contains the domain name and the non .io IP address of each registrant in the sub-directory. Also, the registration of duplicate names is restricted. For example "Spicegirls.io" is limited to one registration.

One system similar to INTERNET ONE is New.net <http://www.new.net>-a private company using a proprietary solution for providing additional top domains not sanctioned by ICANN. They create additional, fictive TLD's by using the format: name.new_domain.{new.net}. For example they would allow you to register as 'favre.law' but then require users to either 1) reach you through a cooperating ISP or 2) add 'plug-in' software to their web browser. Otherwise you would see the real registration: favre.law.new.net. The improvement over INTERNET ONE is that New Net has software that suppresses (hides) the 'new.net' domain name.

Intellectual Property and Privacy Issues on the Internet, McDonald et al. JPOS, p. 47 (Jan. 1997) discloses, "Some commentators have suggested providing "sub-domains" within the ".com" system for types of goods and services or by geographic area, in a manner akin to Yellow Page Listings.-----However, developments do not appear imminent,----".

Along the same lines is: A SOLUTION TO THE PROBLEM? TRADEMARK INFRINGEMENT AND DILUTION BY DOMAIN NAMES: BRINGING THE CYBERWORLD IN LINE WITH THE "REAL" WORLD, Jennifer R. Dupre, Vol. 87 TMR, pps, 629-637. Dupre proposes a system of replacing a domain name with a sub-directory as soon as a request for a registration of a duplicate of the domain name is filed. If implemented, this could be considered an encroachment on the exclusive rights of the owner of the domain name, particularly if the owner of the domain name also owns a trademark in the domain name. It also introduces the problem that content must be moved from one domain name to another after it has been published and perhaps advertised and indexed by search engines.

GATEWAY PAGES: A SOLUTION TO THE DOMAIN NAME CONFLICT? by Puneet Singh, Vol. 91 TMR, p. 1234 discloses "If more than one party sought to register the identical domain name, a directory would be created for that specific domain name, and that domain name would no longer be unique." The directory, in reality, would be a sub-directory under the TLD directory.

A PROPOSAL FOR THE REGISTRATION OF DOMAIN NAMES, Michael A. Sartori, Vol. 87 TMR, p. 638, 653-656 at page 638 discloses a system "----based on the premise of eliminating the uniqueness of domain names". INTERNATIONALIZING DOMAIN NAMES IN APPLICATIONS (IDNA)—RFC 3490 by Internet Engineering Task Force Network Working Group members P. Faltstrom, P. Hoffman and A. Costello. Copyright (C) The Internet Society (2003), the disclosure of which is hereby incorporated by reference. The following is a quotation. "Abstract: Until now, there has been no standard method for domain names to use characters outside the ASCII repertoire. This document defines internationalized domain names (IDN's) and a mechanism called Internationalizing Domain Names in Applications (IDNA) for handling them in a standard fashion. IDN's use characters drawn from a large repertoire (Unicode), but IDNA allows the non-ASCII characters to be represented using only the ASCII characters already allowed in so-called host names today. This backward-compatible representation is required in existing protocols like DNS, so that IDN's can be introduced with no changes to the existing infrastructure. IDNA is only meant for processing domain names, not free text."

The Internet address to the full procedure is:
http://www.ietf.org/rfc/rfc3490.txt?number=3490

BRIEF SUMMARY OF THE INVENTION

In the following Summary, Examples and Claims, 'edge' application refers to the idea of employing software outside the central Domain Name System. This edge application could also be described as e.g. client software or a user agent indicating that it is remote from the central software functions of the Domain Name System. This software application could be local to the individual user as a browser plug-in or similar, or shared by many users through installation at an Internet Service Provider. Characteristically it would act on communications between the individual user and the domain name server or resolver used by the individual.

A previous, parent patent application suggesting that DNS software be edited to add a character would constitute a central change—extending the limited range of Letters a-z, Digits 0-9 and the Hyphen that have been allowed for the past 20 years. An edge application could add this functionality without changing the central software. In many ways making a central change is preferable, but it appears increasingly unlikely that a central change will be approved.

In the following text LDH refers to the limited or abbreviated ASCII character set employed in the Domain Name System. LDH is an abbreviation of Letter, Digit, Hyphen. The Letters in LDH ASCII include both upper case and lower case characters with assigned hexadecimal values 41 through 5A and 61 through 7A, Digits 0-9 with assigned hexadecimal values 30 through 39, and the Hyphen with hexadecimal value 2D. LDH ASCII is a sub-set of the full ASCII character set, and ASCII is a sub-set of the Unicode character set. Non-LDH Unicode by this definition includes any Unicode character not currently allowed for use in domain names.

Rather than editing the central DNS software to allow all 96+ thousand characters of Unicode to be used in domain names, internationalized domain names use an edge application to translate from Unicode to the LDH ASCII of the 20-year old system and back again. The user sees foreign characters such as a Swedish letter A that looks like an umlaut A, or A diaresis, but the domain name system still handles only a-z, 0-9 and "-".

In accord with a previous, parent application, the present invention allows multiple registrations of the same name as Second Level Domain names within the same Top Level Domain. The previous application described the inclusion of a character not normally used in domain names, which necessitates a central change to the Domain Name System.

One way of distinguishing domain names from each other is by use of non-ASCII Unicode characters positioned anywhere inside of the domain name. The Internet Engineering Task Force (IETF) has developed the scripts for using Unicode characters in Internationalized Domain Names, and these characters (together with a number) could flag multiple use of domain names.

The problem with using IDN scripts in the 'dot com' and other generic TLD's familiar in the US is that characters that are the same in ASCII and Unicode character sets are not translated by the IDN scripts—they have the same numerical value in both character sets. The characters normally found on US keyboards are the same in ASCII and Unicode, and non-LDH characters such as the asterisk and pound signs are excluded from domain names under the current rules. Since a normal user cannot input non-ASCII characters from a US keyboard, a different approach is required.

The current improvement requires no new central associated directories, multi-tiered or sub-directories within the domain name system. It does not require modification of the DNS to allow additional characters such as the asterisk. It uses the DNS exactly as it is configured today.

The current improvement is a method of registering similar or identical domain names in an Internet directory consisting essentially of adding one or more unique identifiers to each similar or identical name whereby every name in the directory is distinguished from all other names. The directory is not a sub-directory, but is a top level directory. A group of registered similar or identical domain names may be seen as a logical sub-directory which permits collation for processing purposes. The directory can contain conventional domain names in combination with domain names containing one or more unique identifiers.

The unique identifier in the real registered name relies on the use of LDH ASCII in a prescribed format. When the second or subsequent registration of an existing domain name is requested, the name is registered in the domain name system in a format exemplified by 'ml--name--number' which is in agreement with existing name registration rules.

The unique identifier as seen by the user in a second level domain name can include one or more non-LDH Unicode translations of one or more LDH ASCII characters. Seen by the user, the unique identifier is generated using an edge application and represents a signal or function character indicating a multiplexed name, followed by a number. A letter or other character can be used instead of, or in combination with the number.

The current improvement employs an edge application (user agent) that supports name multiplexing and allows users the convenience of a "name-star-number" (name*number) format while following the restrictions of the domain name system at registration level.

Logical sub-directories dedicated to a collection of similar or related names can be identified by a prefix to the domain name which is unique to a system providing a plurality of similar or related Internet domain names. The prefix can be generated from a user inward to a domain name system using an edge application. The one or more unique identifiers input from the user can be combinations of one or more characters with one or more numbers. Preferably the one or more unique identifiers are an asterisk (*) combined with a number. A logical sub-directory is a collection of related names in a directory, directly accessible in the directory and not collected in a sub-directory as such.

In one embodiment, the Internet directory of the present invention contains a collection of different domain names, each name allowing a plurality of identical names associated with the each name, each identical name distinguished from all other identical names by a unique identifier and distinguished as a logical sub-directory of identical names by a prefix to the each of names. The prefix, for example, is represented by the "ml--" in the string ml--jones--3.com. As seen by the user, the unique identifier in the plurality of identical names described in this paragraph includes one or more non-LDH Unicode characters generated from LDH ASCII characters by an edge application.

The concept of logical sub-directories supports third party compilations. Third party directories can be generated by private companies as their own competing compilations of information about the owners of multiplexed domain names, in order to help users select the 'right' jones.com as per one of my following examples.

In another embodiment of the present invention, a method of retrieving a directory of names by a third party directory supplier comprises entering one of the names in combination with a unique identifier as a search query. A top level domain designation can be included in the search query. The unique identifier(s) can also be a branch of business, post code, telephone area code or other auxiliary information recorded for each name, which makes the directory including this information searchable for specific types of businesses in specific locations, such as plumbers in Pittsburgh, even if a name is unknown. An Internet accessible third party directory based on sub-directories may be defined as an Internet directory based upon names related to domain names.

The prescribed format for registering multiplexed domain names also supports migration of multiplexed names to native use of a signal or function character, should the domain name system be modified in future to include additional characters from the non-LDH character set.

For the purposes of this application, the entire Domain Name System is considered a directory. It is a look-up table or translation table between domain names and their corresponding IP addresses. Top Level Domains each represent a name directory within the DNS. Domain names must be unique within each Top Level Domain.

To multiplex domain names, applications perform the processing needed to input multiplexed names which include a signal character from users, display multiplexed names which include a signal character to users, and process the inputs and outputs from DNS and other protocols that carry domain names.

DETAILED DESCRIPTION OF THE INVENTION

Example 1

The IDN program doesn't allow # or * since these characters have the same numerical value in both ASCII and Unicode and the IDN software would not translate them. These characters are still not allowed in the domain name system (are not in the accepted range of a-z, 0-9 and -) so any internationalized domain name that tried to include # or * would not be allowed. Multiplexed domain names using the * or # as a signal or function character would require a different piece of software with a simple translation function.

Figure 1:
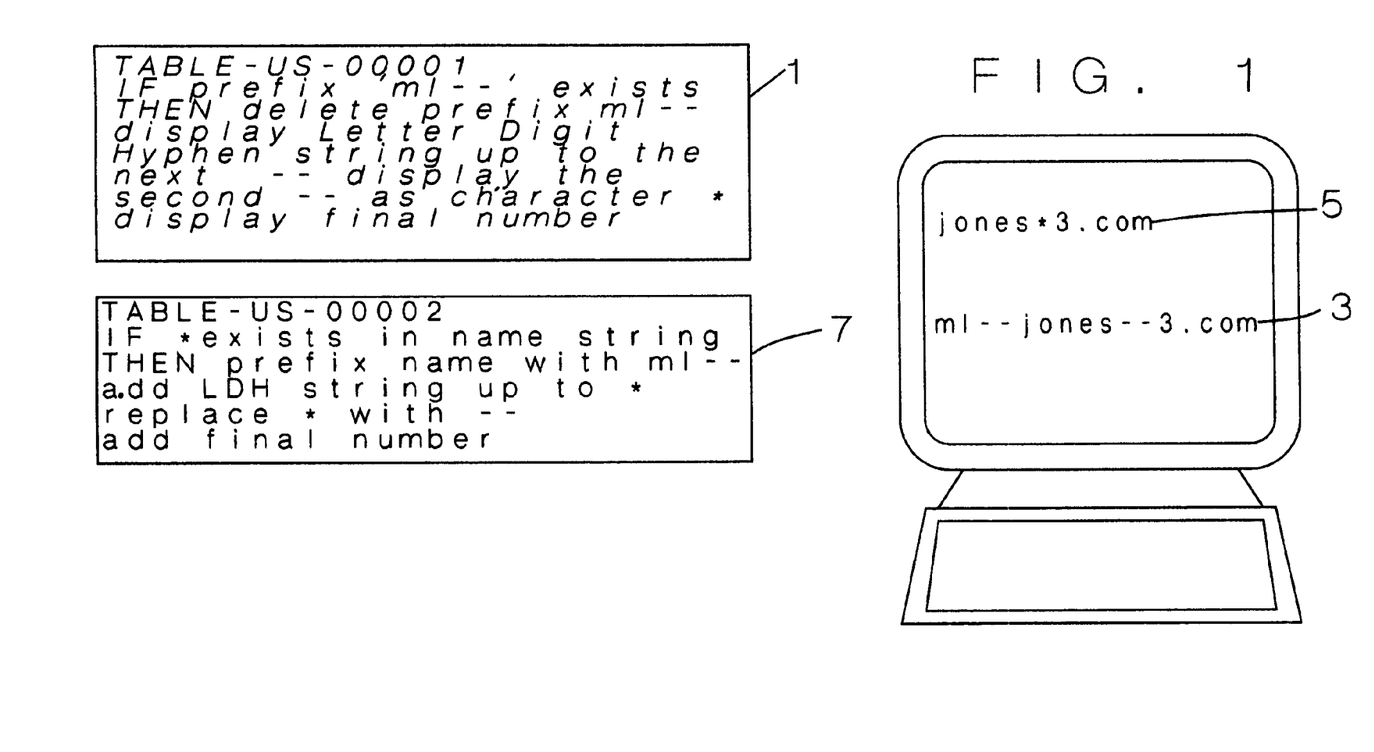
FIG. 1 shows the conversion of identical domain names, except for code character, to ASCII LDH characters.

Turning now to FIG. 1 at Box 1, IF the 'real' registered domain name 3 is ml--jones--3.com, the system could process the second level domain name as follows: TABLE-US-00001 IF prefix 'ml--' exists THEN delete prefix ml-- display Letter Digit Hyphen string up to the next -- display the second -- as character * display final number.

From the user's side—the user types in (or clicks on a link) jones*3.com, shown at 5 and the software runs the following actions shown at 7: TABLE-US-00002 IF * exists in name string THEN prefix name with ml-- add LDH string up to * replace * with -- add final number.

This example shows only the process and is not intended to represent code in any particular programming language. The 'ml--' prefix is only an example, selected since it parallels the conventions standardized in Internationalized Domain Names. Likewise the second '--' could well be 3 or 4 hyphens, or any other string such as '-qq-' not expected in domain names.

The software must work in both directions; it really consists of 2 programs, one translating to, and the other from, the multiplexed format.

"*" or "#" or another ASCII character not currently used in domain names is preferably displayed in the translated display name to show that the domain name in question is a multiple use of a previously registered name. The preferred function or signal character is "*" since it already means 'wildcard' to many computer users, and has a positive connotation when pronounced 'star' in a domain name.

Example 2

Figure 2:
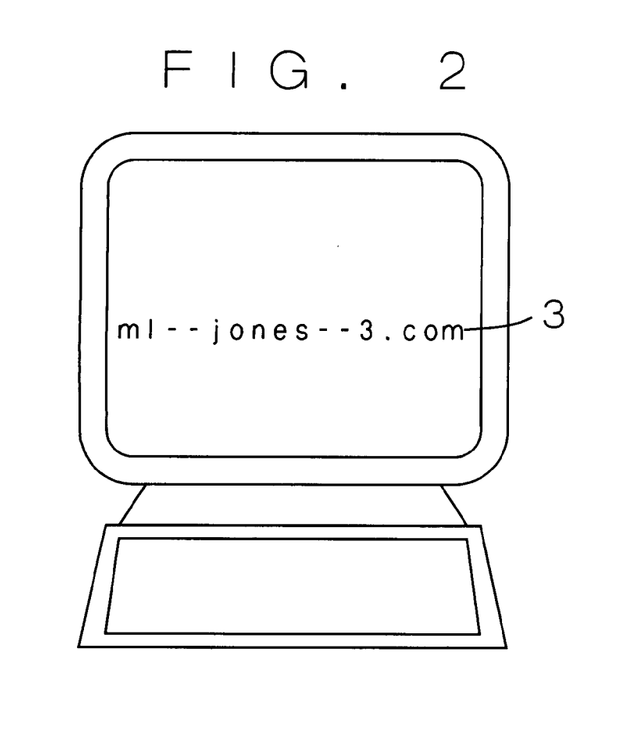
FIG. 2 shows the use of LDH ASCII names containing a double hyphen in combination with a number in domain names to distinguish otherwise identical domain names from each other.

The un-translated name could also be used. Turning now to 3 in FIG. 2, You could type in 'ml--jones--3.com' and no translation would be necessary. It is similar in this way to all domain names in that you can type in the numerical IP address for a resource and not use domain name translation at all.

Example 3

Figure 3:
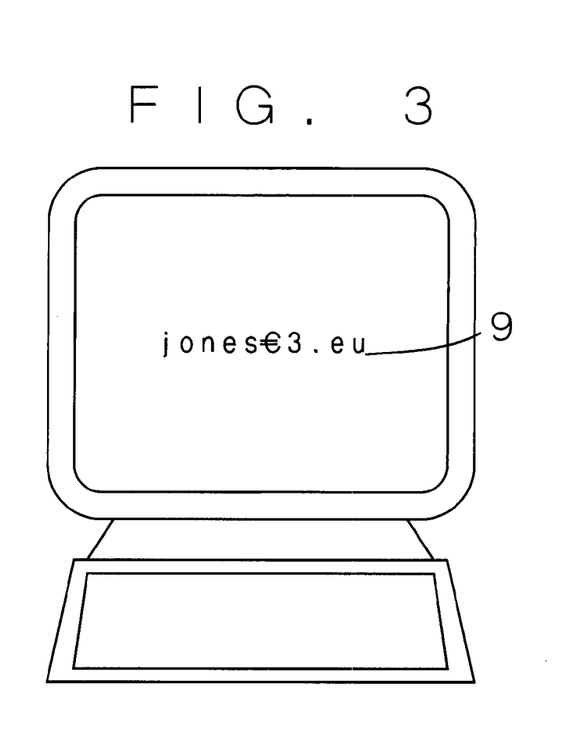
FIG. 3 shows the use of a Euro symbol and a number in otherwise identical domain names to distinguish them from each other.

The current system for existing Internationalized Domain Names could be retained if a different function character were selected, such as, the Euro symbol shown at 9 in FIG. 3, for EU country code names. Internationalized Domain Names employ an edge application. The original restrictions of the DNS are maintained and new characters are translated to and from the limited ASCII of a-z, 0-9 and the hyphen. The Euro symbol could be used in European Union domain names and the existing IDN software can be used to handle it.

Since the Euro symbol is not part of the LDH ASCII character set, it would have to be translated just as the Swedish letter "A" with two dots above it has to be translated. Use of the Euro as a signal or function character in multiplexed domain names would require only agreement among those who register European domain names. National (country code) registries could standardize their own signal or function characters for multiplexing domain names.

Example 4

Figure 4:
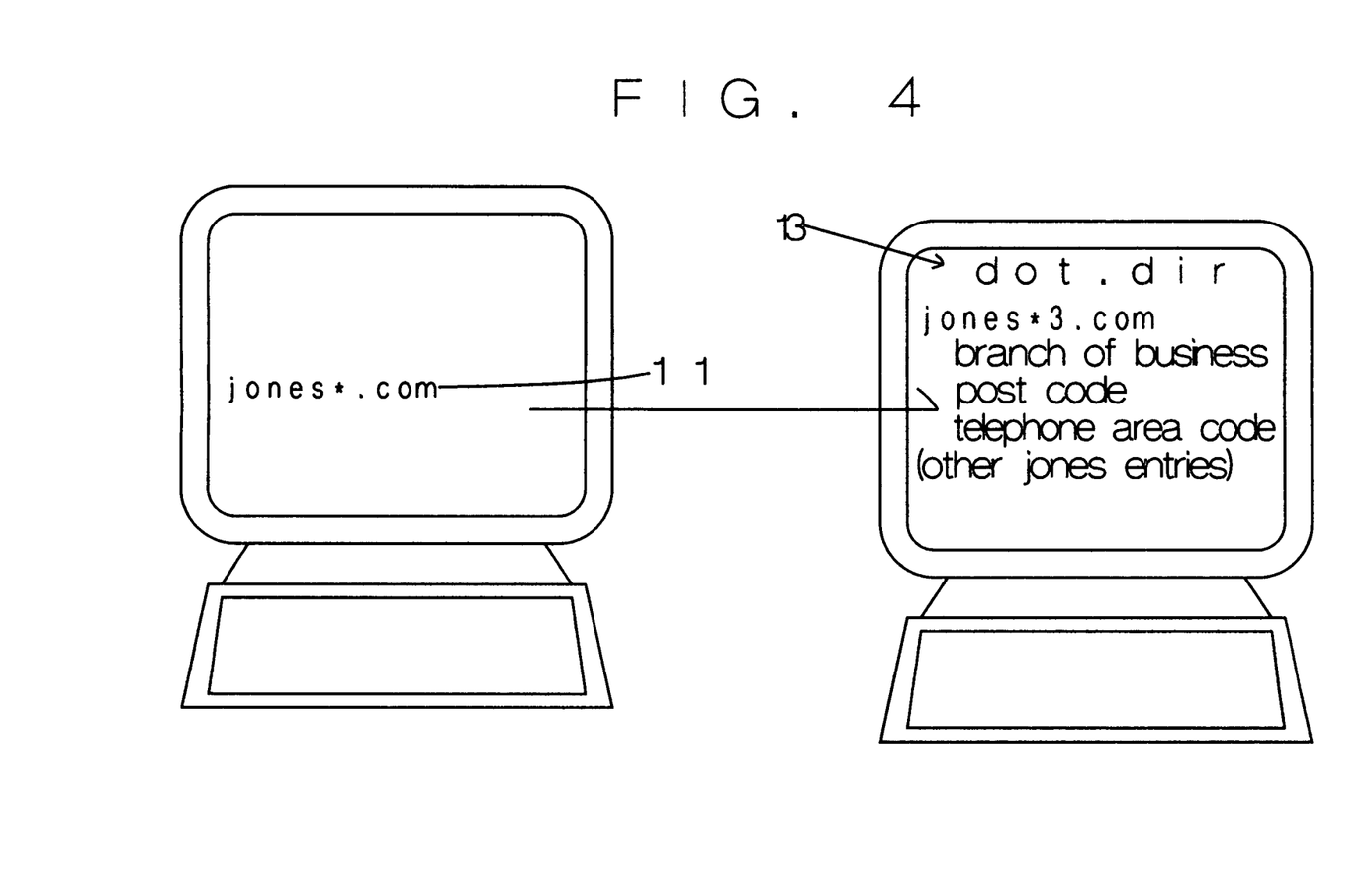
FIG. 4 shows the use of an asterisk in a domain name to spawn a directory of identical domain names distinguished from each other by additional qualifiers.

Since the raw (un-translated) names of Examples 1 and 2 can be registered under existing domain name rules, there need be no sub-directories per name. The use of a prescribed registration format such as ml--name--number simplifies automated creation of directories that are independent of the domain name system, from which the desired jones.com can be selected. As shown in FIG. 4 these directories could work as follows: any time an entry 11 such as 'jones*.com' (without the number) is entered on the address line of a browser, additional branching in the application sketched in Example 1, or another user application, could create the address: 'www.[directory_company].com/directory/jones' which would lead to a directory page 13 of Jones entries presented by the named directory company. A similar query could of course be entered into a search field on a web page or, in accord with descriptions in a parent application, other fields could be filled in an attempt to find a domain name for which additional information has been recorded. This solves not only the 'which Jones' question, but also 'does any company matching my criteria have a domain (a web site) registered?' Search criteria could include branch of business, post code, telephone area code, etc. These directories could even be compiled under their own top level domain name, e.g. 'dot dir'.

Since multiplexed domain names could be used for e-mail addressing and other Internet applications besides the web, on-line name directories would provide a major advancement for Internet users.

Example 5

Additional edge or third party applications could run in the background and refer to a directory as described in Example 4 any time a domain name is selected, to determine whether additional instances of the same domain name are registered and alert the user of their existence.

Example 6

Figure 5:
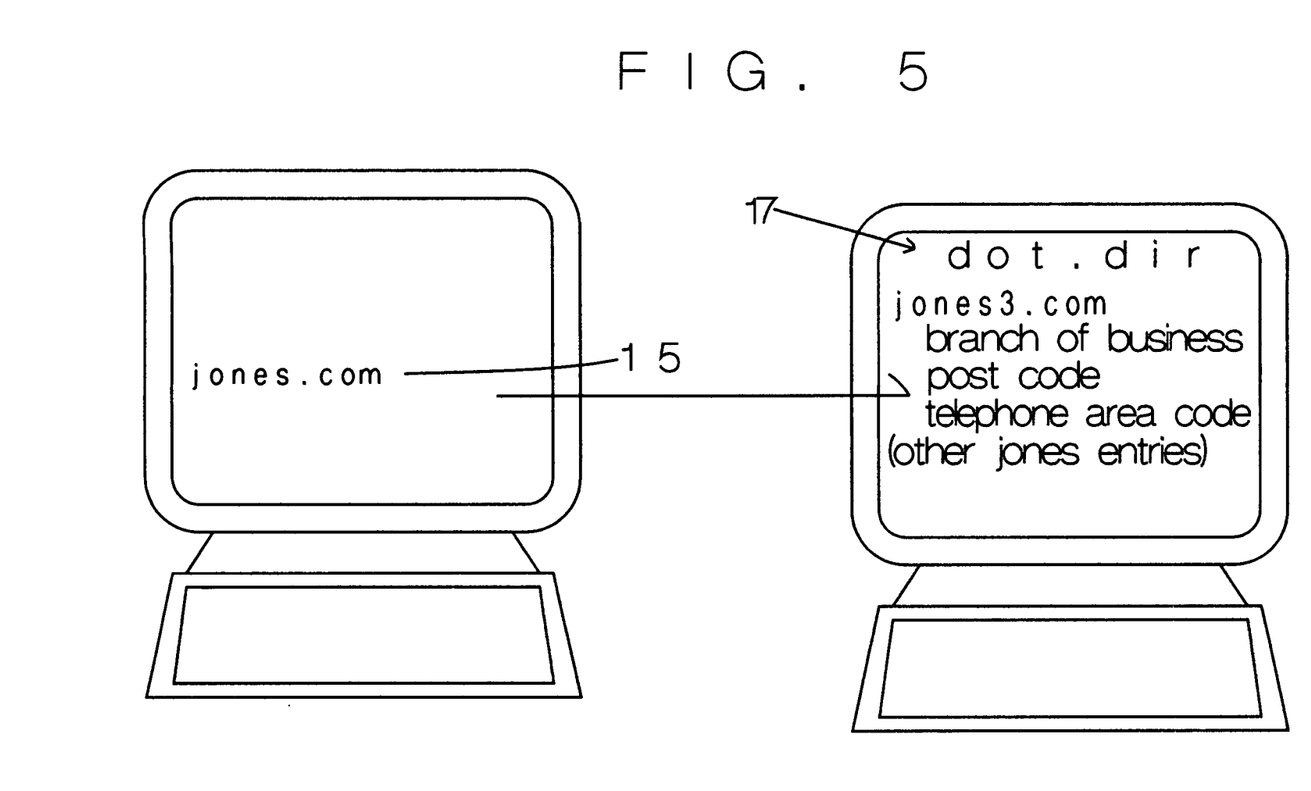
FIG. 5 shows the suppression of the qualifier in the domain names, so that all domain names appear to be the same.

As is shown at 15 and 17 of FIG. 5, additional or slightly modified processing performed by the edge application of Example 1, or the layout of information provided in a directory of Example 4, could suppress display of the unique identifier associated with each instance of a multiplexed domain name, providing the appearance of true multiple use of identical domain names to address different IP addresses. Security and usability concerns make this embodiment less desirable, as the unique identifier provides additional information for the user.

Example 7

Additional or slightly modified processing performed by the edge application of Example 1 could permit differentiation among a number of logical sub-directories. If there are a few owners of a 'Jones' trademark but many companies that wish to identify themselves by the 'Jones' significant part of their company names, the trademark owners may wish to reserve a separate unique qualifier to signify their trademark status.

This could be done in several ways. A different prefix could be used for the registered names, for example tm-- instead of ml--, or two hyphens between the name and the associated number could be changed to three, or the letters 'tm' could be directly appended to the number, etc. Seen by the user this differentiation could present a different signal or function character such as $ instead of * or display the string 'jones*3tm.com' or include the Hypertext Markup Language code string for the trademark character.

In this example sufficient information is provided to the user to distinguish between multiplexed domain names registered by trademark holder and non-trademark holders, and separate logical sub-directories could be created based on this differentiation. The actual name registrations are all within the same Internet directory, with none subordinated to any other.

While the sophistication of multiple logical sub-directories based on this example may be achievable, it may not be advisable in practice based on concerns for usability.

In the claims that follow, each top level domain is considered a directory as is the total domain name system.

I claim:

1. In an Internet directory server having a memory for Internet names to facilitate computers communicating with other computers using TCP/IP, which allows nationals to register different original conventional domain names using Letter Digit Hyphen ASCII (LDH ASCII) characters resulting a plurality of different registered domain names in the memory of an Internet directory server, each registered domain name having a single top level domain name, a second level domain name and having an Internet protocol address (IP), an improvement characterized by:
an added one or more signal character or function character(s) which are ASCII characters not found in the LDH ASCII character set in a plurality of the same second level domain names seen by a user designating those domain names as being multiple registrations of the same domain names, the added one or more signal character(s) being a translation of characters within a central domain name system in the memory of the Internet directory server, the domain names containing the signal character or function character(s) being in addition to, different from each other and not replacing the original conventional registered domain name(s), which original conventional registered domain name(s) retain their original numerical IP address,
wherein the one or more added signal characters seen by the user and not found in the LDH ASCII character set in the second level domain name is the added character(s) generated using an edge application and comprises a translation of one or more LDH ASCII character(s) in a format not conventionally found in a second level domain name, the added one or more signal character(s) being a translation of characters within a central domain name system, the edge application program residing in the memory of a user's computer.

2. The Internet directory server of claim 1 wherein the translation of the character(s) not found in the LDH ASCII character set of claim 1 identifies the Internet name as a trademark or trade name.

3. The Internet directory server of claim 1 wherein the one or more non-LDH ASCII characters seen by the user are non-LDH Unicode translations of one or more LDH ASCII characters in a format not conventionally found in a second level domain name, generated using an edge application.

4. The Internet directory server of claim 1 further comprising a prescribed format of the domain names and including the original conventional domain names and a plurality of each of the original second level domain names in combination with an LDH ASCII translation of a one or more non-LDH ASCII characters.

5. The Internet directory server of claim 4 wherein the prescribed format includes a prefix to the domain names.

6. The Internet directory server of claim 5 wherein the prefix is generated from a user computer inward to a domain name system using an edge application.

7. The Internet directory server of claim 1 wherein the added characters are translations of one or more non-LDH ASCII characters and are combined with one or more numbers.

8. The one or more non-LDH ASCII characters of claim 7 wherein each of the non-LDH ASCII characters is an asterisk (*) combined with a number.

9. An Internet directory server or resolver having a memory for Internet names to facilitate computers communicating with other computers using TCP/IP, which allows nationals to register different conventional domain names resulting in a plurality of different registered domain names in the memory of the Internet directory server or resolver, each different conventional domain name having an Internet Protocol (IP) address and belonging to a single top level domain, the Internet directory server or resolver containing a collection of different domain names, wherein an improvement comprises:

each of the collection of different domain names having a plurality of identical names associated therewith, each identical name distinguished from all other identical names by added characters selected from the Letter Digit Hyphen ASCII (LDH ASCII) character set, the added characters selected from LDH ASCII characters in a prescribed format not conventionally found in domain names, and an edge application program for translating the one or more added characters into one or more non-LDH ASCII characters not found in the LDH ASCII character set for display on a user's computer, and an edge application program for translating one or more non-LDH ASCII characters into the one or more added characters for use in a server or resolver memory, and for translating one or more non LDH ASCII characters into the one or more LDH ASCII characters for use in a server or resolver memory the domain names containing the added LDH ASCII characters in the Internet directory server or resolver memory being in addition to and not replacing the different conventional domain names which different conventional registered domain names retain their original numerical IP address, and the one or more non-LDH ASCII characters acting as a signal character or function character indicating a multiple use of the same domain names.

10. The Internet directory server or resolver of claim 9 wherein each identical name is also distinguished as a member of a logical sub-directory of identical names by one or more LDH ASCII characters, in a prescribed format not conventionally found in secondary domain names, generated from one or more non-LDH ASCII characters using an edge application program.

11. The Internet directory server or resolver of claim 10 wherein a prescribed format includes a prefix to the domain name.

12. The Internet directory server or resolver of claim 9, wherein the one or more non-LDH ASCII characters are generated using an edge application and wherein the non-LDH ASCII characters include an asterisk (*).

13. The non-LDH ASCII characters generated using an edge application of claim 12 wherein the non-LDH ASCII characters generated using an edge application also include a number or other added character in combination with the asterisk (*).

14. A directory server or resolver memory for retrieving a directory of domain names by a third party directory supplier, comprising:

a server or resolver directory memory containing at least one of the domain names in combination with one or more Letter Digit Hyphen (LDH) ASCII characters generated from one or more non-LDH Unicode characters using an edge application, the directory server or resolver memory also containing conventional domain names with information about a possible conventional domain name owner, and the one or more non-LDH Unicode characters acting as a signal character or function character using the edge application indicating multiple use of the same domain name.

15. In an Internet directory server or resolver having a memory for Intermit names to facilitate computers communicating with other computers using TCP/IP, which allows nationals to register different conventional domain names resulting in a plurality of different registered domain names in a server memory of an Internet directory, each of the different registered domain names having an Internet Protocol (IP) address, an improvement characterized by:

a plurality of each of a plurality of otherwise identical secondary domain names in combination with one or more added characters using letter, digit, hyphen ASCII (LDH ASCII) the otherwise identical secondary domain names in combination with the one or more added characters in a format not normally expected in a domain name using LDH ASCII, or are one or more added character(s) using LDH ASCII not expected to be found in a domain name, the otherwise identical names being in addition to and not replacing the different conventional registered domain names.

16. A program for an Internet method encoded in a user's computer memory or a third party's computer memory, the program, when executed in the user's computer or third party's computer performs:

identifying in an Internet domain name, a signal character or function character entered by a user designating that Internet domain name as belonging to a logical sub-directory, the signal character or function character being outside the Letter Digit Hyphen ASCII (LDH ASCII) character set and being combined with a plurality of the same domain names;

displaying the plurality of the same domain names each combined with a signal character or function character;

selecting one of the plurality of the same domain names each combined with the signal character or function character;

displaying the selection.

* * * * *